United States Patent [19]

Kumar et al.

[11] Patent Number: 5,292,375
[45] Date of Patent: Mar. 8, 1994

[54] REMOVAL OF LEAD BASED COATING BY VITRIFICATION

[75] Inventors: Ashok Kumar, Champaign; John P. Petreanu, Oak Forest, both of Ill.

[73] Assignee: The United States of America as represented by the Secretary of the Army, Washington, D.C.

[21] Appl. No.: 71,881

[22] Filed: Jun. 7, 1993

[51] Int. Cl.$^5$ .................. B08V 7/00; B08V 3/14; C03C 23/00; C03B 37/00; C04B 35/14
[52] U.S. Cl. .......................... 134/38; 134/2; 134/4; 134/42; 65/32.5; 501/155
[58] Field of Search ............. 134/42, 38, 2, 4, 19; 65/32.5; 501/155

[56] References Cited

U.S. PATENT DOCUMENTS

| | | | |
|---|---|---|---|
| 3,661,643 | 5/1972 | Lytton et al. | 134/34 |
| 3,850,691 | 11/1974 | Bleil et al. | 134/4 |
| 4,087,285 | 5/1978 | Kurz | 106/52 |
| 4,397,961 | 8/1983 | Snitzer et al. | 501/15 |
| 4,689,271 | 8/1987 | Schittenhelm et al. | 428/446 |
| 4,731,125 | 3/1988 | Carr | 134/17 |
| 4,752,521 | 6/1988 | Smith, III et al. | 428/209 |
| 4,756,765 | 7/1988 | Woodroffe | 134/1 |
| 4,766,096 | 8/1988 | Layden et al. | 501/17 |
| 4,846,866 | 7/1989 | Chyung et al. | 65/18.3 |
| 4,888,311 | 12/1989 | Davidovits et al. | 501/95 |
| 4,947,591 | 8/1990 | Risley | 51/320 |
| 5,017,303 | 5/1991 | Komatsu et al. | 252/174.13 |
| 5,067,978 | 11/1991 | Fowler | 65/134 |

FOREIGN PATENT DOCUMENTS 0036901 11/1979 Japan ............................ 134/4

OTHER PUBLICATIONS

W. H. Zachariasen, "The Atomic Arrangement in Glass", Journ. Amer. Chem. Soc., 54 pp. 3841-3851 (1932).
E. J. Kubel, Jr., "Thermol Spraying Technology: From Art to Science", Advanced Matls. and Processes 12, pp. 69-80 (1987).
R. H. Dovemus, "Electrical Conduchrily and Ionic Diffusion", Glass Scienec, pp. 146-164, John Wiley, NY (1973).
J. E. Stanworth, "Physical Properties of Glass", pp. 9-31 Claredon Press, Oxford (1953).
G. W. Morey, "The Properties of Glass", pp. 204-205, Reinhold Publishing, N.Y. (1954).
Burns & Bradley, "Protective Coating for Metals", pp. 95-98, Reinhold Publishing, N.Y. (1967).
G. S. Milling and D. R. Uhlmann, "Crystallization and Meltine Leinlics of Sodium Dislicate", Phys. and Cheml of Glass, vol. 8, No. 2, pp. 62-68 (1967).
K. Hughes et al. "Measurement of Ionic Transport in Glass. Pt 2. Soda–lead–Silica Glass", Phys & Chem, of Glass, vol. 9, No. 2, p. 43 1968).

Primary Examiner—R. Bruce Breneman
Assistant Examiner—Lorna M. Douyon
Attorney, Agent, or Firm—Luther A. Marsh

[57] ABSTRACT

Lead in coatings on structures can be removed, without creating hazardous waste, by a flame spray process which utilizes a glass composition having high lead solubility, resistance to devitrification, and an expansion coefficient which is substantially different from that of the metal structure. The process comprises flame spraying particles of a glass powder composition onto the lead based coating to form a layer of glass material, permitting the glass layer to cool sufficiently so that it spalls, thereby forming fragments of the glass layer which readily separate from the structure, collecting the glass fragments, and repeating these steps until any organic material in the coating has been pyrolized and removed as part of the fragments, substantially all red lead present in the coating has been reduced to yellow lead, and all of the lead which was in the lead based coating has been removed from the structure by being incorporated into the glass layers. The preferred glass composition comprises at least one glass forming oxide selected from the group consisting of $SiO_2$ and $B_2O_3$; at least one intermediate oxide selected from the group consisting of $Al_2O_3$, $TiO_2$, ZnO, PbO, and $ZrO_2$; and at least one glass modifier oxide selected from the group consisting of $Na_2O$, $K_2O$, CaO, BaO, and NiO.

18 Claims, No Drawings

REMOVAL OF LEAD BASED COATING BY VITRIFICATION

STATEMENT OF GOVERNMENT INTEREST

The invention described and claimed herein may be manufactured and used by or for the Government of the United States of America for governmental purposes without the payment of royalties thereon or therefor.

FIELD OF THE INVENTION

This invention relates to a method using a composition for removing a lead containing coating from an existing structure by vitrification using thermal spray technology.

BACKGROUND OF THE INVENTION

In the past, many structures have been coated with a primer and/or a paint containing lead oxide. It is frequently desirable that such primer and/or paint coatings be removed from the structure, particularly where the coatings are beginning to peel from the structure. While the paint and primer coatings could physically be removed from the structure by impacting an abrasive material against the structure surface, this could expose the workers and the surrounding environment to a hazardous atmosphere due to the resulting dust formation. While the dust formation could be minimized or contained by simultaneously applying a liquid dust control agent, such as water, extensive efforts would then be required to prevent escape of mist droplets containing lead as well as preventing the escape of the resulting large quantity of liquid containing dispersed lead particles. Such coatings could also be removed by applying a torch flame to the coated surface to disintegrate the coating by combustion of the organic components of the coating. However, the resulting ash, which would contain the lead, would also require extensive collecting and retention measures in order to avoid releasing hazardous waste into the environment. Thus, each of these techniques for the removal of such coatings containing lead can cause the formation of a hazardous waste. A lead containing waste material is considered by the Environmental Protection Agency (EPA) to be hazardous waste if it releases a larger than 5.0 ppm concentration of lead.

SUMMARY OF THE INVENTION

It is an object of the present invention to provide a method for removing lead based coatings from structures without creating hazardous waste. It is an object of the present invention to convert a lead based coating on a structure into a material which can be readily separated from the structure but from which the lead is not readily leachable. Another object of the invention is to provide a commercially feasible process for the in situ vitrification of lead oxide, contained in a coating on a structure, through a flame spray application technique.

The present invention provides an in situ vitrification process enabling the successful removal of lead based coatings, e.g., lead based paints and primers, from structures without creating a hazardous waste. The process comprises:

(a) flame spraying particles of a first glass material onto the lead based coating on a surface of the structure to form a primary layer of glass material overlying the lead based coating on the surface being treated, the first glass material having an expansion coefficient which is substantially different from that of the structure;

(b) permitting the primary layer to cool sufficiently so that the primary layer spalls, thereby forming fragments of the primary layer which have separated from the structure;

(c) collecting the thus formed fragments of the primary layer;

(d) flame spraying particles of a second glass material, onto any residue of the lead based coating on the surface treated in steps (a)–(c), to form a secondary layer of glass material overlying the surface being treated, the second glass material having an expansion coefficient which is substantially different from that of the structure;

(e) permitting the secondary layer to cool sufficiently so that the secondary layer spalls, thereby forming fragments of the secondary layer which have separated from the structure; and (f) collecting the thus formed fragments of the secondary layer.

The steps (a), (b), and (c) can be performed in sequence at least one time, and, before proceeding with step (d), are preferably repeated until at least substantially all of any organic material in the lead based coating has been pyrolized and the resulting pyrolized material has been at least substantially removed as part of the primary layer fragments and until substantially all of any red lead present in the lead based coating is reduced to yellow lead, the latter being more susceptible to diffusion into a secondary layer of glass material.

The steps (d), (e), and (f) can be performed in sequence at least one time, and are preferably repeated in sequence until all of the lead which was in the lead based coating on the surface of the structure being treated has been removed from the structure by being incorporated into the primary and/or secondary glass layers.

At least the second glass material, and preferably also the first glass material, is a composition which exhibits a high lead ion solubility for incorporation of the lead into the resulting glass layers, but which contains the incorporated lead so that it is at least substantially non-leachable therefrom. The first and second glass materials can have the same or different compositions.

Each of the first and second powdered glass materials will comprise at least one glass network forming oxide, at least one intermediate oxide, and at least one glass network modifier oxide. Preferably, each of these first and second glass materials comprise at least one glass forming oxide selected from the group consisting of silicon dioxide ($SiO_2$) and boron oxide ($B_2O_3$); at least one intermediate oxide selected from the group consisting of aluminum oxide ($Al_2O_3$), titanium dioxide ($TiO_2$), zinc oxide (Zno), lead monoxide (Pbo), and zirconium oxide ($ZrO_2$); and at least one glass network modifier oxide selected from the group consisting of sodium monoxide ($Na_2O$), potassium monoxide ($K_2O$), calcium oxide (Cao), barium oxide (Bao), and nickel oxide (NiO).

It is presently preferred that the powdered glass composition comprises at least silicon dioxide ($SiO_2$), aluminum oxide ($Al_2O_3$), titanium dioxide ($TiO_2$), zinc oxide (Zno), sodium monoxide ($Na_2O$), potassium monoxide ($K_2O$), calcium oxide (CaO), and barium oxide (BaO). In addition to these ingredients, the presently preferred powdered glass composition also contains boron oxide ($B_2O_3$).

DETAILED DESCRIPTION

The mechanism of the invention is believed to be composed of three stages. The first stage involves the pyrolysis and the removal of any organics present in the lead based coating. This step is a major controlling factor of lead cation diffusion since lead cation diffusion into the glass layer is generally inhibited in the presence of large amounts of pyrolized organic matter. With the limited absorption of organic matter into the layer of glass material, a dark brown or black tint in the glass layer is generally observed. This reaction should be driven to completion in order to provide proper and efficient lead oxide vitrification. In the presence of organic materials and/or byproducts of the pyrolysis of organic materials, inadequate wetting of the substrate will generally result in substantially lower levels of lead diffusion. This first stage can be accomplished by the steps of:

(a) flame spraying particles of a glass material onto the lead based coating on the surface of the structure being treated, to form a primary layer of glass material overlying the lead based coating on the surface being treated, the glass material having an expansion coefficient which is substantially different from that of the structure;

(b) permitting the primary layer to cool sufficiently so that the primary layer spalls, thereby forming fragments of the primary layer which have separated from the structure; and (c) collecting the thus formed fragments of the primary layer.

The steps (a), (b), and (c) are performed at least one in sequence, and are repeated in sequence as many times as necessary to assure that at least substantially all of any organic material in the lead based coating has been pyrolized and the resulting pyrolized ? material has been at least substantially removed as part of the primary layer fragments, before proceeding with step (d).

The second stage involves the reduction of $Pb_3O_4$ (red lead) to PbO (yellow lead). This reaction is endothermic and occurs at 556° C. It is marked by a noticeable color change from red ($Pb_3O_4$) to yellow (PbO). Thus, it is desirable that the powdered glass material being flame sprayed onto the lead based coating have a temperature substantially greater than 556° C., and preferably greater than 700° C., and more preferably greater than 1200° C., at the time of the formation of the layer of glass material. Due to the temperature of the molten glass particles being flame sprayed over the lead based coating, at least some of any red lead present will be converted to the yellow lead form with each performance of step (a). The steps (a), (b), and (c) are performed in sequence, and are preferably repeated in sequence until substantially all of any red lead present in the lead based coating has been reduced to yellow lead, before proceeding with step (d). Thus, steps (a), (b), and (c) are appropriate even for red lead based coatings which do not contain any organic material.

The third stage involves the diffusion of the lead oxide into the layer of glass material. The rate of the diffusion of yellow lead into the glass layer is substantially greater than the rate of diffusion of the red lead. Thus, it is desirable that the reduction of red lead to yellow lead be driven to completion in the second stage. Once the first stage has been at least substantially completed and the second stage has been at least partially performed, the third stage can be accomplished by the steps of:

(d) flame spraying particles of a glass material onto any residue of the lead based coating on the surface treated in steps (a)–(c), to form a secondary layer of glass material overlying the surface being treated, the glass material having an expansion coefficient which is substantially different from that of the structure;

(e) permitting the secondary layer to cool sufficiently so that the secondary layer spalls, thereby forming fragments of the secondary layer which have separated from the structure; and (f) collecting the thus formed fragments of the secondary layer.

The steps (d), (e), and (f) are performed in sequence and are preferably repeated in sequence until all of the lead which was in the lead based coating on the surface of the structure being treated has been removed from the structure by being incorporated into the primary and/or secondary glass layers.

Obviously, there can be some overlap of the stages with respect to time, in that all three stages can be initiated in the first flame spray application. However, the first two stages should be driven to completion as quickly as feasible so that the third stage can be accomplished in a more efficient manner. Moreover, the process of steps (a)–(f) is also appropriate even for lead based coatings which do not contain any organic material and wherein the lead is already in the form of yellow lead.

The glass layers formed in steps (a) and (d) can have any suitable thickness, and should be continuous so as to assure complete coverage of the surface being treated. In general, the thickness of the glass layers will be in the range of about 1/32 inch to about ⅛ inch, and preferably in the range of about 1/16 inch to about 3/32 inch.

The rate of cooling in steps (b) and (e) can be any suitable rate. However, rapid cooling prevents relief of stress gradients which result from difference in cooling of the surface of the glass layer and the interior of the glass layer. The cooling can be passively accomplished by simple exposure of the surface of the molten glass layer to the ambient air, or it can be aggressively aided by directing one or more streams of cooling fluid against the surface of the glass layer.

The collection of the spalled fragments in steps (c) and (f) can be accomplished by providing a container positioned beneath the portion of the structure being treated so that the fragments can drop by gravity into the container. However, if desired, the portion of the structure being treated can be surrounded by a temporary shroud so as to avoid any escape of the spalling fragments.

The process can be applied to remove a lead based coating from any structure which is capable of withstanding the temperatures of the flame spraying process without significant detrimental effects. The process is particularly applicable to metal structures, e.g., bridges, storage tanks, etc., as well as to concrete structures which have been painted.

Any suitable number of flame spray applications of the powdered glass material onto the lead based coating can be employed to remove the lead based coating by vitrification. In general these three stages can be accomplished with a total of three to five flame spray applications of the powdered glass material, with each application being followed by collection of the spalling fragments of the applied glass material. The number of flame spray applications desirable for a particular situation will depend on the particular properties of the glass powder composition and the thickness and composition of the lead based coating. After the powdered glass material is flame sprayed onto the lead based coating to form a layer of glass over the lead based coating, the glass layer is permitted to cool sufficiently for the glass layer to spall as a result of the residual internal stresses in the glass layer and/or the thermal expansion coefficient mismatch between the glass layer and the substrate.

Flame spraying is a known technique in which a fine powder is dispersed into a gas stream and passed through a combustion flame, so that the powder becomes molten. The gas stream is directed toward a surface to be treated, such that the gas stream, expanding rapidly due to the heating by the combustion flame, projects the molten particles against that surface. A carrier gas can be utilized to feed the powder into a suitable combustible gas, while an oxygen containing gas can be supplied to the flame sprayer to provide the combustion of the gaseous fuel.

While any suitable flame spraying equipment can be utilized, this invention was developed with the use of a TeroDyn System 3000 III High Energy Combustion Gun, a TecFlo 5102 Powder Feeder and a Gas Monitor and Control Package. This particular flame spraying system was designed to operate with any industrial type gaseous fuel, e.g., acetylene, propylene, or propane, while the powder carrier gas is preferably an inert gas, e.g., nitrogen or argon. The flame spray gun can be machine mounted or it can be hand held by attaching a pistol grip to the gun.

The following processing variables are important factors in the flame spray process:
(1) oxygen and gaseous fuel flow rates;
(2) carrier gas flow rate, (powder flow rate);
(3) particle size and uniformity of the powder;
(4) duration of flame spray pass; and
(5) distance of stand-off of applicator from surface being treated.

While the process reproducibility is affected by these variables, the selection of suitable values for these factors for a particular situation is within the scope of one of ordinary skill in the flame spraying art.

The glass powder characteristics are particularly important for satisfactory operation. In general the power feed system, as well as the flame spray gun nozzle, will operate best with glass powders which exhibit narrow particle size distribution and good flowability. Continuous effective operation dictates that the glass powders utilized are preferably non-agglomerating and non-hygroscopic powders. The powder processing scheme is composed of four major identifiable steps: (1) batching and mixing, (2) fusing and fritting, (3) milling, (4) and particle size segregation. The control of these steps is important as the powder morphology and characteristic reproducibility is dependent on the processing methodology as well as the raw materials used. Fritting is an important process which serves to assure quality control by creating a homogeneous composition. If the glass compound was applied directly from the raw batch, uneven mixing would result in different compositions each time.

The suitability of a glass powder composition for use in the process of the present invention is a function of the following process variables:
(1) lead ion solubility;
(2) resistance to devitrification and acid attack (leaching);
(3) melting point;
(4) viscosity; and
(5) surface structure/properties.

In order to promote the spalling of the applied glass material, the expansion coefficient of the glass layer has to be substantially different from that of the structure which forms the substrate for the lead based coating. In general the difference in expansion coefficients of the powdered glass material and the structure should be at least 25%, preferably at least 50%, and more preferably at least about 75%, based on the lower expansion coefficient value. As the expansion coefficient of suitable glasses is generally greater than that of commonly employed structural metals such as steel, the expansion coefficient of the glass layer will be at least 25% greater, preferably at least about 50% greater, and more preferably at least about 75% greater, than that of the metal substrate. The expansion coefficient of steel is approximately $6.5 \times 10^{-6}$ mm/mm° C. Thus the expansion coefficient of a glass material suitable for use in accordance with the present invention for the removal of a lead based coating from a steel structure is preferably at least about $12 \times 10^{-6}$ mm/mm° C.

Glass is an amorphous substance. As an amorphous material does not show any long range order, there is no regularity in the arrangement of its ionic constituents. A classical description of glass is that it can form extended three dimensional networks lacking periodicity, with an energy content comparable with that of the corresponding crystal network.

Theoretically any substance could be transformed into a glass through a process known as supercooling. In practice, however, only a few substances can force a glass. The majority of glass systems are composed of a combination of three types of oxides: glass network formers, intermediate oxides, and glass network modifiers. Glass network formers such as silica or boron oxide construct the backbone of the supercooled liquid in the metastable state. The presence of glass network formers is essential as neither the glass network modifying oxides (e.g., alkaline earth oxides) nor the intermediate oxides can form the glass network on their own. The glass network modifying oxides lead to a weakening of the glass structure, act as fluxes, and lower viscosity. The intermediate oxides (e.g., $Al_2O_3$, $TiO_2$) take part in the glass network formation. The selection of the oxides is very important in determining the behavior of the resulting glass coating. For example, as a lower viscosity allows for greater workability, more fluxes might be used or the amount of the silica might be increased.

The absorption of lead oxide from the lead based coating into the glass network is highly contingent on the cationic diffusion behavior and the surface properties of the glass composition. This is a function of the free energy of the system. From the Stokes-Einstein equation an important relationship can be drawn relating the melt viscosity to the diffusion coefficient of a certain species with radius r $$D = (kT)/(6\pi\eta r) \qquad (1)$$

where k is the Boltzman's constant, D is the diffusion coefficient, $\eta$ is the viscosity, and T is the absolute temperature. As the viscosity decreases the diffusion coefficient increases. However, the viscosity is dependent on the temperature as well as the glass composition.

The diffusion coefficient, D, can also be described in terms of the random walk of a molecule. From the probability of finding a molecule at a certain place following a set number of steps $$D = g a^2 T \quad (2)$$

where g is a geometrical factor, $a^2$ is the average of the squares of step lengths, and $\Gamma$ is the average number of steps in one unit time. For ionic diffusion the jump rate $\Gamma_m$ can be predicted from several models; the most common one is $$\Gamma_m = \Gamma exp[(dS_m/R - dH_m)/RT] \quad (3)$$

where $v$ is the vibrational frequency of the diffusing atom, $dS_m$ and $dH_m$ are the entropy and enthalpy of activation for the motion of the atom from one site to another. There is some evidence that the vibrational frequency is also a function of temperature.

The absorption rate is a function of the surface tension of the glass. It is related to the free energy accompanying the formation of a new surface which depends on the composition and the structure of the surface layers. The surface tension is indirectly proportional to temperature.

Thus, at least the second glass material, which is employed for the third stage, and preferably also the first glass material, which is employed for the first and second stages, is a composition which exhibits a high lead ion solubility for incorporation of the lead into the resulting glass layers, but which contains the incorporated lead so that it is at least substantially nonleachable therefrom. While the first and second glass materials can have different compositions, it is presently preferred that the first and second glass materials be identical, thereby simplifying the production, storage and usage of the powdered glass materials.

Each of the first and second powdered glass materials will comprise at least one glass network forming oxide, at least one intermediate oxide, and at least one glass network modifier oxide. In general, each of these first and second glass materials comprises at least one glass forming oxide selected from the group consisting of silicon dioxide ($SiO_2$) and boron oxide ($B_{23}$); at least one intermediate oxide selected from the group consisting of aluminum oxide ($Al_2O_3$), titanium dioxide ($TiO_2$), zinc oxide (ZnO), lead monoxide (PbO), and zirconium oxide ($ZrO_2$); and at least one glass network modifier oxide selected from the group consisting of sodium monoxide ($Na_2O$)l potassium monoxide ($K_2O$), calcium oxide (Cao), barium oxide (BaO), and nickel oxide (NiO). It is presently preferred that the powdered glass composition comprises at least silicon dioxide ($SiO_2$), aluminum oxide ($Al_2O_3$), titanium dioxide ($TiO_2$), zinc oxide (ZnO), sodium Monoxide ($Na_2O$), potassium monoxide ($K_2O$), calcium oxide (CaO), and barium oxide (BaO). In addition to these ingredients, the presently preferred powdered glass composition also contains boron oxide ($B_2O_3$).

Silicon dioxide ($SiO_2$) and boron oxide ($B_2O_3$) are the preferred glass network formers. Silicon dioxide is the preferred main glass network forming component and promotes a high melting temperature, a low coefficient of thermal expansion, and higher acid resistance. The use of boron oxide as a glass network former helps lower the melting temperature and helps adjust the coefficient of thermal expansion. The glass network forming oxides will generally constitute from about 35 to about 75 weight percent of the total glass powder composition, preferably from about 50 to 75 weight percent of the total glass powder composition, and more preferably from about 60 to 75 weight percent of the total glass powder composition.

The concentration of the silicon dioxide will generally be in the range of about 35 to about 75 weight percent of the total glass powder composition, preferably in the range of about 50 to about 75 weight percent of the total glass powder composition, and more preferably in the range of about 60 to about 70 weight percent of the total glass powder composition. The concentration of boron oxide will generally be in the range of about 0 to about 25 weight percent of the total glass powder composition, preferably in the range of about 0 to about 10 weight percent of the total glass powder composition, and more preferably in the range of about 0 to about 5 weight percent of the total glass powder composition. Where boron oxide is included in the glass composition, it will generally be present in an amount which is at least about 0.1 weight percent of the total glass powder composition. It is presently preferred that the glass powder composition contain from about 60 to about 70 weight percent silicon dioxide and from about 0.1 to about 5 weight percent boron oxide based on the total glass powder composition.

Other glass network formers, which can be used in small amounts, totaling generally less than 5 weight percent of the total glass powder composition, include $P_2O_5$, $GeO_2$, $BeF_2$, $As_2O_3$, and the like, and combinations of any two or more thereof.

Suitable network modifying components include sodium monoxide ($Na_2O$), potassium monoxide ($K_2O$), calcium oxide (CaO), barium oxide (BaO), nickel oxide (NiO), and combinations of any two or more thereof. In general, the network modifying components reduce the melting temperature and the viscosity of the glass powder composition, as well as providing good water attack resistance and values of the coefficient of thermal expansion. The network modifying components will generally constitute from about 10 to about 40 weight percent of the total glass powder composition, preferably from about 15 to 35 weight percent of the total glass powder composition, and more preferably from about 20 to 35 weight percent of the total glass powder composition.

Sodium monoxide is a fluxing agent which weakens the silica network in glasses, lowering the viscosity. Sodium monoxide is the principal flux used in glass manufacture, and is generally obtained from sodium carbonate. The concentration of sodium monoxide will generally be in the range of about 1 to about 25 weight percent of the total glass powder composition, preferably in the range of about 2 to about 20 weight percent of the total glass powder composition, and more preferably in the range of about 4 to about 10 weight percent of the total glass powder composition.

Potassium monoxide is also a fluxing agent which weakens the glass network and decreases the viscosity of the melt, but is slightly less active on a weight basis than sodium monoxide. The concentration of potassium monoxide will generally be in the range of about 3 to about 25 weight percent of the total glass powder composition, preferably in the range of about 5 to about 20 weight percent of the total glass powder composition, and more preferably in the range of about 8 to about 16 weight percent of the total glass powder composition.

Calcium oxide is a glass modifying oxide which acts as a flux at high temperatures, lowering the viscosity. At lower temperatures the double charge of the calcium ion pulls the network together, making it more rigid and less readily attacked by water. The concentration of calcium oxide will generally be in the range of 0 to about 10 weight percent of the total glass powder composition, preferably in the range of about 1 to about 8 weight percent of the total glass powder composition, and more preferably in the range of about 3 to about 6 weight percent of the total glass powder composition.

Barium oxide is a glass modifier which increases the density of the glass. The concentration of barium oxide will generally be in the range of 0 to about 10 weight percent of the total glass powder composition, preferably in the range of about 1 to about 10 weight percent of the total glass powder composition, and more preferably in the range of about 1 to about 6 weight percent of the total glass powder composition.

Nickel oxide behaves as a glass modifier in the glass structure and as a colorant. The presence of the nickel oxide is particularly useful in qualitatively evaluating the transfer of the lead ions into the glass layer due to the change in color of the nickel containing glass with increasing lead concentration. The concentration of nickel oxide will generally be in the range of 0 to about 5 weight percent of the total glass powder composition, preferably in the range of about 0 to about 1 weight percent of the total glass powder composition, and more preferably in the range of about 0.5 to about 1 weight percent of the total glass powder composition.

Suitable intermediate oxides include aluminum oxide ($Al_2O_3$), titanium dioxide ($TiO_2$), zinc oxide (Zno), lead monoxide (PbO), and zirconium oxide ($ZrO_2$), and mixtures of any two or more thereof. The intermediate oxides will generally constitute from about 3 to about 30 weight percent of the total glass powder composition, preferably from about 5 to about 20 weight percent of the total glass powder composition, and more preferably from about 5 to about 15 weight percent of the total glass powder composition.

Aluminum oxide melts at about 2050° C., but it crystallizes very quickly such that it cannot be classified as a glass network former. It is a major constituent of refractories, in which it is combined with silica. Aluminum oxide helps lower the coefficient of thermal expansion, raises the melting temperature, and increases the surface tension. Aluminum oxide also provides a highly refractory characteristic and very good chemical durability, increasing resistance to acidic attack. If uniformly distributed, alumina is beneficial as it retards devitrification and improves the durability of the glass. The concentration of aluminum oxide will generally be in the range of 0 to about 10 weight percent of the total glass powder composition, preferably in the range of about 1 to about 8 weight percent of the total glass powder composition, and more preferably in the range of about 2 to about 5 weight percent of the total glass powder composition.

Titanium dioxide can be used in addition to or in place of the aluminum oxide, particularly where acid resistance is desired. The concentration of titanium dioxide will generally be in the range of about 0 to about 5 weight percent of the total glass powder composition, preferably in the range of about 0.1 to about 1 weight percent of the total glass powder composition, and more preferably in the range of about 0.2 to about 0.6 weight percent of the total glass powder composition.

The addition of zinc oxide will increase chemical stability. In wet reactions, zinc oxide has an amphoteric character, dissolving in solutions of caustic alkalis to form zincates and in acids to form zinc salts. The concentration of zinc oxide will generally be in the range of 0 to about 15 weight percent of the total glass powder composition, preferably in the range of about 1 to about 10 weight percent of the total glass powder composition, and more preferably in the range of about 2 to about 5 weight percent of the total glass powder composition.

Lead monoxide acts as a flux in glass Belting, increases the density of the glass, and lowers the surface tension. Lead promotes good resistance to water, but not to acids. The concentration of lead oxide will generally be in the range of 0 to about 5 weight percent of the total glass powder composition, and preferably in the range of about 0 to about 1 weight percent of the total glass powder composition.

Zirconium oxide has good refractory properties. The concentration of zirconium oxide will generally be in the range of 0 to about 5 weight percent of the total glass powder composition, and preferably in the range of about 0 to about 1 weight percent of the total glass powder composition.

As the present invention relies upon the fracturing of the glass layer into fragments which will readily spall or separate from the structure upon sufficient cooling of the glass layer, each of the first and second glass compositions should be at least substantially free of elements which would severely hinder the spalling of the glass coating upon sufficient cooling thereof. Thus, in general, reinforcing fibers, and particularly long reinforcing fibers, should be avoided. Similarly, any components which promote long term bonding of the glass layer to the substrate, such as cobalt oxide and manganese oxide, should be avoided, at least in any concentrations which would materially promote the long term bonding.

The glass compounds can be prepared by fusing the various oxides together to form a glass, fritting the glass, and then ball milling the resulting frits to produce a glass powder having a uniform composition. To obtain the required flowability and to minimize powder agglomeration, at least some of the fines produced in the ball milling operation can be removed. The resulting powder having the desired composition and particle size distribution for flame spraying can be fed to a flame spray apparatus for application to the surface to be treated. It is presently preferred that the glass powder to be used as the feedstock to the flame sprayer have a particle size in the range of about 200 mesh to about 350 mesh.

EXAMPLE

Red lead found in a lead based primer was successfully removed from steel surfaces through an in situ vitrification process in accordance with the present invention.

A specially designed energy efficient refractory glass melting furnace was used to melt the raw glass batch. Heating was accomplished with two burners which operated with a mixture of propane and compressed air as fuel. The glass fusing and fritting procedure used was as follows:

(1) A 14 ounce Denver fire-clay crucible was ⅔ compacted with powder and placed into the center of the furnace hot zone.

(2) The burners were initially activated at one quarter capacity (to avoid crucible damage due to thermal shock) and as the crucible temperature increased the burners were incrementally turned up to maximum capacity. Maximum furnace temperature was 1400°–1450° C. The furnace temperature was monitored with an optical pyrometer.

(3) More powder was added to fill the crucible.

(4) The melt was allowed to fine for 90–180 minutes. Fining is a very important step since it served to assure homogeneity in the final product.

(5) Following the completion of the fusing step the crucible was quickly removed from the furnace and the molten glass was poured into a large metal container filled with water. Pouring too slowly will cause the glass to solidify before it could all be poured.

(6) The resulting glass frit was removed from the water and placed into a drying furnace for 12 hours at 85°–95° C.

The dried fritted glass was then placed into a closed, alumina ball mill cylinder which was ⅔ filled with 2.5 cm diameter alumina balls. A sieve analysis was used to determine the optimum ball milling schedule which ranged between 4.5 and 6.5 hours. These milling times yielded the largest percentage of particles in the desired range (>200 mesh to <350 mesh). Since the fines (>350 mesh) are detrimental to powder flowability and they promote agglomeration, they were reprocessed. Particles larger than 200 mesh were further ball milled.

Glass standards were prepared with various concentrations of lead (from 1 wt % to 25 wt %). Each of the glass standard samples was ball milled for size reduction and then analyzed for lead concentration and lead cation leachability rates.

A 36 steel platestock, 1.25 cm thick, was cut into 6x6 cm specimens. The squares were painted with red lead oxide primer followed by an aluminum top coat. The major component of the lead primer was red lead, and the primer also contained linseed oil. These painted samples were then allowed to cure for one month. Once cured the painted samples were fixed to a large steel backing plate inside a fume hood where the painted surface of each of the samples was flame sprayed with a glass powder composition, using a TeroDyn System 3000 III High Energy Combustion Gun, a TecFlo 5102 Microflo Power Feeder, and a Gas Monitor and Control Package. The optimized flame spray parameters were:

| Nozzle | RL 3310 or RL 210 |
|---|---|
| Spray rate | 1.33–2.00 lbs/hr |
| Standoff distance | 3.5–8.0 inches |
| Acetylene | 12 psi/46 SCFM |
| Oxygen | 50 psi/136.5 SCFM |
| Carrier gas (N₂) | 55 psi/132 SCFM |
| Terometer | 125 |

In the foregoing table, SCFM is Standard Cubic Feet per Minute. The Terometer indicates the energy required to deliver powder over various distances, and thus monitors powder delivery rate.

Although the flame spray parameters were optimized, minor adjustments were made, depending on the characteristics of the glass powder being flame sprayed.

The glass coated specimens were allowed to cool until spalling of the glass coating occurred. The glass spalls were then collected and temporarily sealed in polyethylene containers to avoid any contamination. The presence of organic pyrolysis by-products in each initial pass served to impede the diffusion of the lead ion into the glass network. As a result, the spalls from each initial flame spray pass were collected and reprocessed to insure that the final waste material passed the Toxicity Characteristic Leaching Procedure (TCLP) tests. Several flame spray passes were found to be necessary to completely remove the lead present in the lead based coating on the steel substrate. The number of flame spray passes needed was determined to be a function of the thickness of the lead based coating.

For each specimen, the collected glass spalls were ball milled for size reduction and analyzed for lead cation concentration and lead cation leachability rates, and then correlated with the previously prepared standard samples with known lead concentrations.

In each instance the analysis for lead cation concentration used Micro X-Ray Spectrometry (XRS) techniques. Also, in each instance the lead cation leachability rate was determined by leaching the lead cations using the U.S. Environmental Protection Agency approved Toxicity Characteristic Leaching Procedure (TCLP) 1311. The leachate was then digested using EPA technique 3010A. The lead cation concentration of the leachate was then determined using flame absorption spectrophotometry.

Since actual field tests are expensive and difficult to coordinate, a simulation was also performed by acquiring weathered steel samples having a coated surface comprising red lead paint. These weathered field samples were flame sprayed in the laboratory using the same parameters listed above for the laboratory prepared samples. The glass spalls were collected for analysis using the above analysis techniques. The data was then compared with that obtained from the laboratory prepared samples. Very little variation was found between the field samples and the laboratory prepared samples. The small variations which were found were attributed to the differences in the coating thickness encountered.

Several glass compositions which showed the best results are set forth in the following table, wherein the components are listed in terms of their weight percent of the total glass powder composition:

TABLE

| COMPO-NENT | COMPOSITIONS | | | | | | | | |
|---|---|---|---|---|---|---|---|---|---|
| | A | B | C | D | E | F | G | H | I |
| SiO₂ | 69.1 | 35.0 | 64.1 | 65.1 | 65.1 | 65.1 | 63.0 | 68.0 | 58.0 |
| B₂O₃ | — | 25.0 | 3.0 | — | — | — | 1.3 | 1.3 | 11.3 |
| Al₂O₃ | 4.0 | — | 4.0 | 2.0 | 4.0 | 4.0 | 0.6 | 0.6 | 0.6 |
| TiO₂ | 2.0 | — | 0.5 | — | — | 0.75 | — | — | — |
| ZnO | — | 10.0 | 3.0 | 3.0 | 3.0 | 3.0 | 3.0 | 3.0 | 3.0 |
| PbO | — | — | 0.5 | — | — | 5.0 | 7.75 | 10.75 | 10.75 |
| ZrO₂ | — | — | 0.5 | — | — | — | — | 3.0 | 3.0 |
| Na₂O | 5.9 | 10.0 | 4.8 | 6.8 | 6.8 | 1.3 | 12.6 | — | 7.6 |
| K₂O | 15.0 | 10.0 | 12.2 | 15.6 | 13.6 | 8.6 | 11.0 | — | 6.0 |
| CaO | 3.0 | — | 5.0 | 5.0 | 5.0 | 5.0 | 0.5 | 5.5 | 5.5 |
| BaO | — | 10.0 | 2.0 | 5.0 | 5.0 | 4.0 | — | — | — |
| NiO | — | — | 0.4 | — | — | 0.25 | 0.25 | 0.25 | 0.25 |

The acidic resistance of the borosilicate glass composition (B) is inferior to that of the alkali silicate glass composition (A). However, since this process is a surface phenomena, the lower melt viscosity and melting point of a borosilicate glass can be advantageous for some applications. Each of the compositions (A), (C), (D), (E), (F), (G), (H), and (I) had a relatively high viscosity due to the large silica content. Compositions (C), (D), (E), and (F) exhibited greater resistance to acid attack than did compositions (G), (H), and (I). Compositions (C), (D), (E), and (F) also exhibited lower TCLP values than did compositions (G), (H), and (I). Composition (C) is the presently preferred glass powder composition.

In the flame spraying process, the presence of organic pyrolysis by-products served to impede lead cation diffusion into the glass network. The lead ion leachability of the spalls from the initial flame spray passes was higher than for spalls from subsequent passes on the same sample. As the diffusion of the lead cation occurs at the interface of the lead based coating and the glass layer, an intimate contact between the molten glass surface and the lead cation is required. However, the effect of the presence of organic by-products was only observed for the initial flame spray pass, and subsequent passes did not appear to be affected by any organic by-products.

In each instance, the lead present in the organic coating was successfully removed from the steel substrate by in situ vitrification using a glass powder composition in accordance with the present invention.

On the basis of the information provided by these tests this technique has the following advantages over the lead abatement techniques presently used:
1. Structure containment is not required.
2. Collection and decontamination of the waste is not necessary when the glass spalls resulting from the flame spraying process successfully passes the EPA's TCLP.
3. No particulate lead is released as a result of this technique.
4. Relative simplicity of process steps consistently produces reproducible results.

Reasonable variations and modifications are possible within the scope of the foregoing description and the appended claims to the invention.

That which is claimed is:

1. A method for removing a lead based coating from a surface of a structure without creating a hazardous waste, said method comprising:
   (a) flame spraying particles of a first glass material onto the lead based coating on said surface to form a primary layer of glass material, said first glass material having an expansion coefficient which is substantially different from that of said structure;
   (b) permitting said primary layer to cool sufficiently so that said primary layer spalls, thereby forming fragments of said primary layer which have separated from said structure;
   (c) collecting the thus formed fragments of said primary layer;
   (d) flame spraying particles of a second glass material onto the residue of said lead based coating on said surface to form a secondary layer of glass material, said second glass material having an expansion coefficient which is substantially different from that of said structure;
   (e) permitting said secondary layer to cool sufficiently so that said secondary layer spalls, thereby forming fragments of said secondary layer which have separated from said structure; and
   (f) collecting the thus formed fragments of said secondary layer.

2. A method in accordance with claim 1, further comprising performing steps (a), (b), and (c) in sequence until at least substantially all of any organic material in said lead based coating has been pyrolized and the resulting pyrolized material has been at least substantially removed as part of the primary layer fragments.

3. A method in accordance with claim 2, wherein steps (a), (b), and (c) are performed in sequence until substantially all of any red lead present in said coating has been reduced to yellow lead.

4. A method in accordance with claim 3, wherein steps (d), (e), and (f) are performed in sequence until substantially all of the lead which was in the lead based coating on said surface of the structure has been removed from said structure.

5. A method in accordance with claim 4, wherein the composition of the second glass material permits yellow lead on said surface of the structure to diffuse into a thus formed layer of said second glass material on said surface.

6. A method in accordance with claim 5, wherein said second glass material exhibits high lead ion solubility.

7. A method in accordance with claim 6, wherein the second glass material which is being flame sprayed is a nonagglomerating powder, and wherein any lead contained in said fragments of said secondary layer is at least substantially nonleachable therefrom.

8. A method in accordance with claim 7, wherein each of said first glass material and said second glass material comprises at least one glass forming oxide, at least one intermediate oxide, and at least one glass modifier.

9. A method in accordance with claim 8, wherein said at least one glass forming oxide constitutes from about 35 to about 75 wt. % of the total glass composition, wherein said at least one intermediate oxide constitutes from about 3 to about 30 wt. % of the total glass composition, and wherein said at least one glass modifier constitutes from about 10 to about 40 wt. % of the total glass composition.

10. A method in accordance with claim 9, wherein said at least one glass forming oxide is at least one oxide selected from the group consisting of $SiO_2$ and $B_2O_3$; wherein said at least one intermediate oxide is at least one oxide selected from the group consisting of $Al_2O_3$, $TiO_2$, $ZnO$, $PbO$, and $ZrO_2$; and wherein said at least one glass modifier oxide is at least one oxide selected from the group consisting of $Na_2O$, $K_2O$, $CaO$, $BaO$, and $NiO$.

11. A method in accordance with claim 10, wherein the $SiO_2$ constitutes from about 50 to about 75 wt. % of the total glass composition, wherein the $B_2O_3$ constitutes from about 0.1 to about 10 wt. % of the total glass composition.

12. A method in accordance with claim 11, wherein the $Al_2O_3$ constitutes from about 0 to about 10 wt. % of the total glass composition, wherein the $TiO_2$ constitutes from about 0 to about 5 wt. % of the total glass composition, wherein the $ZnO$ constitutes from about 0 to about 15 wt. % of the total glass composition, wherein the $PbO$ constitutes from about 0 to about 5 wt. % of the total glass composition, and wherein the $ZrO_2$ constitutes from about 0 to about 5 wt. % of the total glass composition.

13. A method in accordance with claim 11, wherein the $Na_2O$ constitutes from about 1 to about 25 wt. % of the total glass composition, wherein the $K_2O$ constitutes from about 3 to about 25 wt. % of the total glass composition, wherein the CaO constitutes from about 0 to about 10 wt. % of the total glass composition, wherein the BaO constitutes from about 0 to about 10 wt. % of the total glass composition, and wherein the NiO constitutes from about 0 to about 5 wt. % of the total glass composition.

14. A method in accordance with claim 8, wherein said at least one glass forming oxide is at least one oxide selected from the group consisting of $SiO_2$ and $B_2O_3$ and constitutes from about 50 to about 75 wt. % of the total glass composition; wherein said at least one intermediate oxide is at least one oxide selected from the group consisting of $Al_2O_3$, $TiO_2$, ZnO, PbO, and $ZrO_2$ and constitutes from about 5 to about 20 wt. % of the total glass composition; and wherein said at least one glass modifier is at least one oxide selected from the group consisting of $Na_2O$, $K_2O$, CaO, BaO, and NiO and constitutes from about 15 to about 35 wt. % of the total glass composition.

15. A method in accordance with claim 14, wherein the $SiO_2$ constitutes from about 60 to about 70 wt. % of the total glass composition, wherein the $B_2O_3$ constitutes from about 0 to about 5 wt. % of the total glass composition, wherein the $Al_2O_3$ constitutes from about 2 to about 5 wt. % of the total glass composition, wherein the $TiO_2$ constitutes from about 0.2 to about 0.6 wt. % of the total glass composition, wherein the Zno constitutes from about 2 to about 5 wt. % of the total glass composition, wherein the PbO constitutes from about 0 to about 1 wt. % of the total glass composition, wherein the $ZrO_2$ constitutes from about 0 to about 1 wt. % of the total glass composition, wherein the $Na_2O$ constitutes from about 4 to about 10 wt. % of the total glass composition, wherein the $K_2O$ constitutes from about 8 to about 16 wt. % of the total glass composition, wherein the CaO constitutes from about 3 to about 6 wt. % of the total glass composition, wherein the Bao constitutes from about 1 to about 6 wt. % of the total glass composition, and wherein the NiO constitutes from about 0 to about 1 wt. % of the total glass composition.

16. A method in accordance with claim 1, wherein said first glass material consists of about 60 to about 70 wt. % $SiO_2$, about 0.1 to about 5 wt. % $B_2O_3$, about 1 to about 8 wt. % $Al_2O_3$, about 0.1 to about 1 wt. % $TiO_2$, about 1 to about 10 wt. % ZnO, about 0 to about 5 wt. % PbO, about 0 to about 5 wt. % $ZrO_2$, about 2 to about 20 wt. % $Na_2O$, about 5 to about 20 wt. % $K_2O$, about 1 to about 8 wt. % Cao, about 1 to about 10 wt. % BaO, and about 0 to about 1 wt. % NiO, each wt. % being based on the total glass powder composition.

17. A method in accordance with claim 1, wherein said second glass material consists of about 50 to about 75 wt. % $SiO_2$, about 0 to about 10 wt. % $B_2O_3$, about 1 to about 8 wt. % $Al_2O_3$, about 0.1 to about 1 wt. % $TiO_2$, about 1 to about 10 wt. % Zno, about 0 to about 5 wt. % PbO, about 0 to about 5 wt. % $ZrO_2$, about 2 to about 20 wt. % $Na_2O$, about 5 to about 20 wt. % $K_2O$, about 1 to about 8 wt. % CaO, about 1 to about 10 wt. % Bao, and about 0 to about 1 wt. % NiO, each wt. % being based on the total glass powder composition.

18. A method in accordance with claim 17 wherein $Na_2O$ is present in the range of about 4 to about 10 wt. %, wherein $K_2O$ is present in the range of about 8 to about 16 wt. %, wherein Cao is present in the range of about 3 to about 6 wt. %, wherein BaO is present in the range of about 1 to about 6 wt. %, wherein $Al_2O_3$ is present in the range of about 2 to about 5 wt. %, wherein $TiO_2$ is present in the range of about 0.2 to about 0.6 wt. %, and ZnO is present in the range of about 2 to about 5 wt. %, each wt. % being based on the total glass powder composition.

* * * * *